April 6, 1926. 1,579,503
L. BLOCH
VALVE
Filed May 27, 1925

Inventor
Leon Bloch.
By
Hill Brock & West
Attys.

Patented Apr. 6, 1926.

1,579,503

UNITED STATES PATENT OFFICE.

LEON BLOCH, OF CLEVELAND, OHIO.

VALVE.

Application filed May 27, 1925. Serial No. 33,137.

*To all whom it may concern:*

Be it known that I, LEON BLOCH, a citizen of the United States, residing at Cleveland, in the county of Cuyahoga and State of Ohio, have invented a certain new and useful Improvement in Valves, of which the following is a full, clear, and exact description, reference being had to the accompanying drawings.

This invention relates generally to plumbing fixtures and more particularly to a novel construction of valve used in connection with a bath tub and shower.

The object of the invention is to provide a valve which will serve both as a mixing valve and as a diverter valve, that is to say, a single device that can be used in connection with inlet-valves (not shown) to mix the hot and cold water to the proper temperature, and deliver to the tub or shower the water at any desired temperature, either all hot, all cold or mixed and modified.

Another object of the invention is to provide a valve of this character which will be of simple and economical construction and in which the parts can be readily replaced or repaired, if necessary.

With these objects in view and certain others which will become apparent as the description proceeds, the invention consists in the novel features of construction and in the manner of combining or arranging the same all of which will be fully described hereinafter and set forth in the appended claims.

Figure 1:
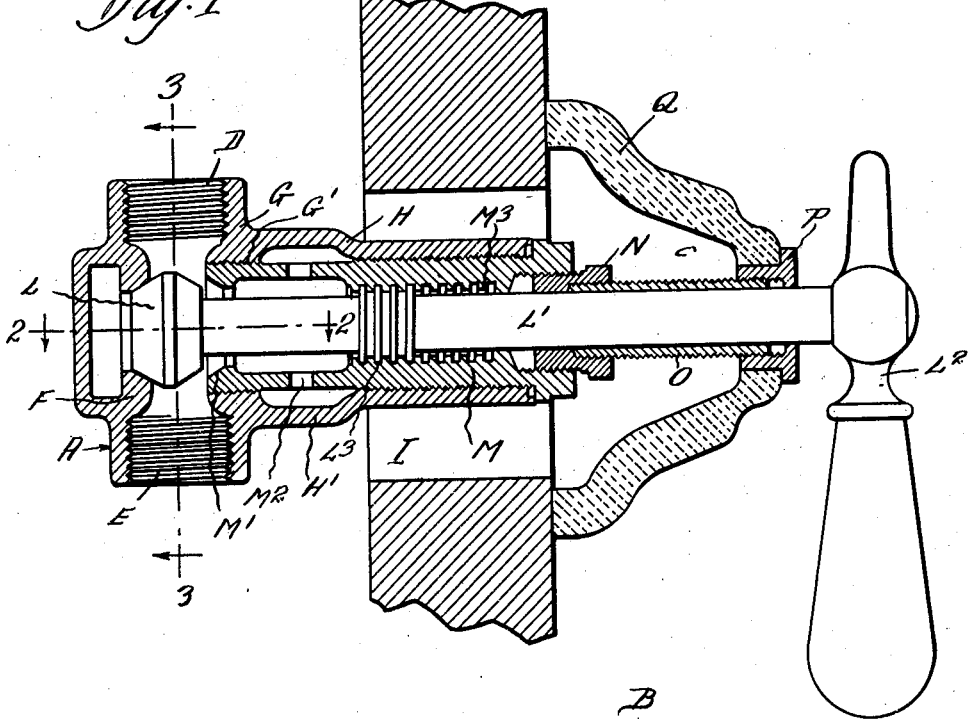
Figure 2:
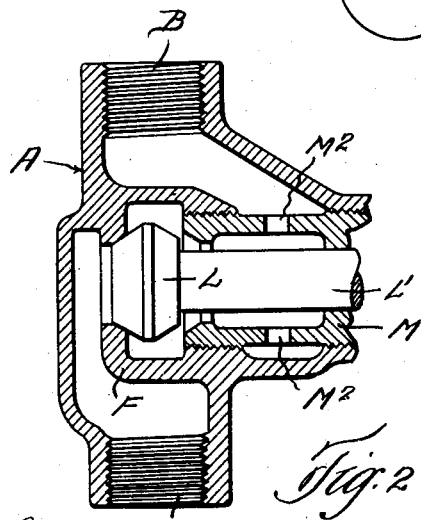
Figure 3:
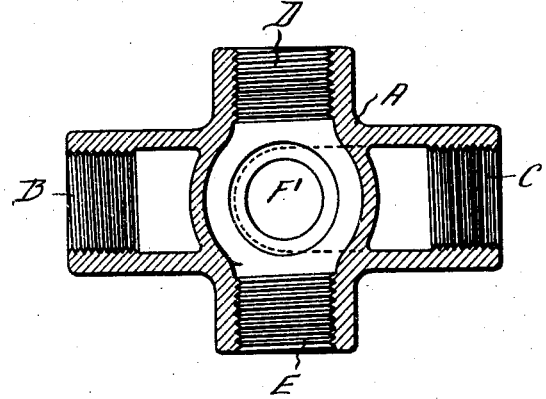

In the drawings forming a part of this specification, Fig. 1 is a vertical sectional view of a valve constructed in accordance with my invention and illustrating the manner of arranging the same; Fig. 2 is a detail sectional view taken on the line 2—2 of Fig. 1 and looking in the direction of the arrows; and Fig. 3 is a detail vertical sectional view taken on the line 3—3 of Fig. 1 and looking in the direction of the arrow.

In the practical embodiment of my invention, I employ a valve casing A having an outlet B at one side and an outlet C at the opposite side, one of the outlets leading to a shower and the other outlet being adapted to be connected to a bath tub, an inlet D adapted to be attached to a hot water supply and an inlet E adapted to be attached to a cold water supply. The casing is divided into two compartments by means of partitions F and G and these partitions form in effect an inlet chamber into which the hot and cold water are delivered. The casing is also formed with a tubular extension or housing H which is adapted to extend into the opening I produced in the wall or tiling K.

The partition F has an opening F' the edges of which are finished to provide a valve seat for the valve L carried at the end of the stem L' and provided at its outer end with the operating handle $L^2$. The stem of the valve L' is provided with threads $L^3$ which engage the threads $M^3$ of a sleeve M screwed into the housing H and into the threaded opening G' produced in the partition G.

The tubular extension or housing H is slightly enlarged at H' in order to provide an annular space between the inner end of the sleeve M and the lateral extension of the valve casing and the extreme inner end of the sleeve M is finished to provide the valve seat M' upon which the valve L can seat when said valve is shifted from the reverse position to that shown in Figs. 1 and 2.

The sleeve M is provided with ports $M^2$ which establish communication between the interior of the sleeve and the enlarged portion H' of the housing, which housing communicates through the connection B with a shower outlet (not shown), it being understood that water from the inlets D and E passes through opening M' in the sleeve M, when the valve L is moved to the position shown in Figs. 1 and 2, and thence through the ports $M^2$ into the enlarged portion H of the housing and thence out the connection B.

The joint between the casing extension H and the sleeve M is suitably packed, and surrounding the stem L' and screwing into the outer end of the sleeve M is a gasket N. Screwing into this gasket N is a sleeve O threaded externally to receive a cap or gasket P which is flanged for engagement with the porcelain escutcheon Q which surrounds and conceals the valve and also the opening in the wall or tiling in which said valve is arranged.

It will thus be seen that I provide a valve casing having inlets for the hot and cold water and outlets for the tub and shower and by moving the valve to seat in the opening in the partition F the outlet C will be cut off and the outlet B will be opened allowing the water to pass to the shower and by shifting the position of the valve the outlet B will be closed and the outlet C will be opened allowing the water to pass to the tub, it being understood of course that the supply of hot and cold water to the valve is controlled by separate valves in the hot and cold water pipes (not shown).

The valve is exceedingly simple consisting of the casing and lateral extension and sleeve arranged therein, one valve seat being carried at the inner end of the sleeve and the other valve seat in the partition in the casing.

By means of the packings arranged as described, all danger of leakage is avoided and the construction of the valve also lends itself to the employment of the concealing escutcheon which not only conceals the valve proper but also the opening in the wall or tiling in which the same is arranged.

It will thus be seen that I provide an exceedingly simple and economical form of a valve and particularly adapted for use in connection with tub and shower fixtures for providing the proper mixing of the hot and cold water.

Having thus described by invention, what I claim is:

1. A valve of the class described comprising a casing having a plurality of inlets and a plurality of outlets, said casing having a tubular extension having communication with said casing and with one of said outlets, a sleeve mounted in said tubular extension and having a valve seat at its inner end and communicating with said tubular extension, a valve member movable within said casing and adapted to seat within said casing to close another of said outlets or to seat against the valve seat on the inner end of said sleeve and means for moving said valve member.

2. In a device of the kind described the combination with a valve casing having a plurality of inlets and a plurality of outlets, of a sleeve inserted into said casing, a valve adapted to selectively seat upon seats carried by said casing and sleeve for selectively closing said outlets, a stem for said valve working in the sleeve, said sleeve having openings for establishing communication between the casing and one of said outlets.

3. In a device of the kind described, the combination with a valve casing having a lateral tubular extension, and two outlets and two inlets, said casing having two apertured partitions therein between the outlets and the inlets, of a sleeve inserted in the aperture of one of said partitions and having a valve seat at its inner end, a valve stem movable in said sleeve and having a valve adapted to seat against the seat at the end of said sleeve or upon a seat formed in the aperture in the other partition, said sleeve having openings therein whereby communication is established between the casing and one of the outlets.

4. In a device of the kind described the combination with a valve casing having a plurality of inlets and a plurality of outlets, said casing having a pair of apertured partitions between the outlets and the inlets, the aperture in one partition being provided with a valve seat, a sleeve inserted in the opening in the other partition and having a valve seat at its inner end, said sleeve being arranged in a tubular extension of the valve casing, there being an annular space between said tubular extension and sleeve adjacent the inner end thereof and in communication with one of said outlets, said sleeve having openings communicating with said annular space, a stem working in said sleeve, a valve member at the inner end of said stem and adapted to engage either valve seat, an escutcheon arranged upon the stem together with means for securing said escutcheon in place.

5. A diverter valve for the purpose specified comprising a casing having a pair of inlets and a pair of outlets, a pair of partitions formed integral with said casing between the inlets and outlets respectively, said partitions cooperating with the walls of said casing to form a pair of outlet chambers communicating with the aforementioned outlets respectively, oppositely disposed ports in said partitions, a valve stem extending into said casing and having valves on the inner end thereof, said valve stem adapted to be actuated to move said valves to alternately open and close the ports in said partitions whereby to divert the flow through either of said outlet chambers.

6. A diverter valve of the class described comprising a casing having a pair of inlets and a pair of outlets, a pair of partitions integral with said casing between the inlets and outlets respectively, oppositely disposed ports in said partitions, a valve stem extending into said casing and having a valve means on the inner end thereof, said valve stem adapted to be actuated to move said valve means to alternately open and close the ports in said partitions whereby to divert the flow through either of said outlets.

7. A diverter valve for the purpose set forth comprising a casing having a pair of inlets and a pair of outlets, a pair of partitions formed within said casing between the inlets and outlets respectively, said casing adjacent said partitions being enlarged whereby to cooperate with said partitions to form a pair of outlet chambers communicating respectively with said aforementioned outlets, oppositely disposed ports in said partitions, a valve stem extending into said casing and having valves thereon, said valve stem adapted to be actuated to move said valves to alternately open and close the ports in said partitions whereby to divert the flow through either of said outlet chambers.

In testimony whereof, I hereunto affix my signature.

LEON BLOCH.